(12) United States Patent
Okada

(10) Patent No.: US 8,240,176 B2
(45) Date of Patent: Aug. 14, 2012

(54) STEERING LOCK DEVICE

(75) Inventor: Takahiro Okada, Kanagawa-ken (JP)

(73) Assignee: Alpha Corporation, Yokohama-shi, Kanagawa-Ken (JP)

( * ) Notice: Subject to any disclaimer, the term of this patent is extended or adjusted under 35 U.S.C. 154(b) by 0 days.

(21) Appl. No.: 13/060,867

(22) PCT Filed: Aug. 28, 2009

(86) PCT No.: PCT/JP2009/065074
§ 371 (c)(1),
(2), (4) Date: Feb. 25, 2011

(87) PCT Pub. No.: WO2010/024386
PCT Pub. Date: Mar. 4, 2010

(65) Prior Publication Data
US 2011/0154869 A1    Jun. 30, 2011

(30) Foreign Application Priority Data

Aug. 29, 2008 (JP) .............................. P2008-221347
Aug. 21, 2009 (JP) .............................. P2009-191784

(51) Int. Cl.
*B60R 25/02* (2006.01)
(52) U.S. Cl. ............... 70/182; 70/183; 70/190; 70/192; 70/209; 70/237; 70/239; 70/252; 70/253; 70/254; 292/170

(58) Field of Classification Search ............ 70/182–192, 70/252–254, 201, 209, 237, 239; 292/170
See application file for complete search history.

(56) References Cited

U.S. PATENT DOCUMENTS

| | | | | |
|---|---|---|---|---|
| 5,036,686 A * | 8/1991 | Ichinose | ......................... | 70/186 |
| 6,125,671 A * | 10/2000 | Suzuki | ............................ | 70/186 |
| 6,694,785 B1 * | 2/2004 | Hsieh | ............................... | 70/209 |
| 6,755,058 B2 * | 6/2004 | Zillmann | ........................ | 70/252 |
| 7,065,993 B2 * | 6/2006 | Fukushima | ..................... | 70/252 |
| 7,870,768 B2 * | 1/2011 | Tanioka et al. | ................. | 70/186 |
| 2002/0029595 A1 * | 3/2002 | Limburg et al. | ................. | 70/186 |
| 2008/0087056 A1 * | 4/2008 | Tsukazaki | ....................... | 70/182 |
| 2008/0178643 A1 * | 7/2008 | Okuno et al. | ................... | 70/184 |
| 2009/0064739 A1 * | 3/2009 | Trischberger et al. | .......... | 70/237 |
| 2009/0084145 A1 * | 4/2009 | Sugimoto | ....................... | 70/186 |

FOREIGN PATENT DOCUMENTS

JP        10-138870 A       5/1998
WO     2006/092186 A2     9/2006

* cited by examiner

*Primary Examiner* — Lloyd Gall
*Assistant Examiner* — Ifeolu Adeboyejo
(74) *Attorney, Agent, or Firm* — The Nath Law Group; Jerald L. Meyer; Stanley N. Protigal

(57) ABSTRACT

A steering lock device includes a pin protruded from a side surface of an arm of a slider, a guide groove disposed on a housing to accommodate the slider slidably, and a cover wall the pin when the slider positions at its lock end within the guide groove. According to the steering lock device, it can be made difficult to unlock a steering shaft through an improper act, and thereby superior antitheft performance can be brought.

6 Claims, 11 Drawing Sheets

STEERING LOCK DEVICE

This is a National Phase Application filed under 35 U.S.C. 371 as a national stage of PCT/JP2009/065074, filed Aug. 28, 2009, an application claiming the benefit from Japanese Application No. P2008-221347, filed Aug. 29, 2008 and Japanese Application No. P2009-191784, filed Aug. 21, 2009, the entire content of each of which is hereby incorporated by reference in its entirety.

TECHNICAL FIELD

The present invention relates to a steering lock device that locks rotation of a steering shaft of an automobile.

BACKGROUND ART

As a conventional steering lock device for an automobile, one disclosed in WO2006/092186 (Patent Document 1) is known. A configuration of this steering lock device 100 is shown in FIG. 17. The steering lock device 100 includes a lock member 103, a driven body 106, and a pin 108. The lock member 103 is urged toward a steering shaft 102 of an automobile by a coil spring 101, and capable of being engaged with the steering shaft 102. The driven body 106 is disposed so as to be able to reciprocate in a direction crossing a moving direction of the lock member 103. In addition, a rack 107 is formed on the driven body 106. The rack 107 is coupled with a motor 104 via a gear mechanism 105, and driven by the motor 104. Further, the driven body 106 has a wedge-shaped lock stopper 108. The lock stopper 108 is disposed so as to be able to reciprocate along a moving direction of the driven body 106. A wedged slope 108a of the lock stopper 108 contacts with a stopper hole 109, and the lock stopper 108 shifts the lock member 103 from a lock position to an unlock position along with its slide.

The motor 104 is rotated to its lock direction when the automobile is parked, so that the lock stopper 108 shifts toward a lock position (rightward in FIG. 17) together with the driven body 106 and the lock member 103 shifts to its lock position due to an urging force of a coil spring 101. As a result, an end of the lock member 103 is engaged with the steering shaft 102 to prohibit rotation of the steering shaft 102, and thereby it is made impossible to drive the automobile.

After that, the motor 104 is rotated to its unlock direction, so that the lock stopper 108 shifts toward an unlock position (leftward in FIG. 17) together with the driven body 106. Here, the lock member 103 moves along the slope 108a of the lock stopper 108 and shifts from its lock position to its unlock position. As a result, an engagement between the lock member 103 and the steering shaft 102 is released to enable the rotation of the steering shaft 102, and thereby the automobile is made possible to be steered.

SUMMARY OF THE INVENTION

However, the driven body 106 and the lock stopper 108 are not protected in a case 110. Therefore, a cover 110a may be removed by an improper act, so that the driven body 106 and the lock stopper 108 may be carelessly removed to remove the lock member 103. Namely, a configuration of the above-mentioned steering lock device 100 is a problematic configuration with respect to antitheft performance.

Therefore, an object of the present invention is to provide a steering lock device that can make a steering shaft difficult to be unlocked by an improper act and can deliver superior antitheft performance.

A first aspect of the present invention provides a steering lock device that includes a lock member disposed in a housing that is slidable between a lock position at which the lock member engages with a steering shaft to prohibit a rotation of the steering shaft and an unlock position at which the lock member doesn't engage with the steering shaft to allow the rotation of the steering shaft, and urged toward the steering shaft by an urging member; and a slider disposed in the housing that is slidable between a lock end and an unlock end along a direction perpendicular to a moving direction of the lock member. A sloped portion that is linearly sloped toward the steering shaft along a slide direction of the slider is provided on one of the lock member and the slider, and a sloped hole is provided on another of the lock member and the slider. The sloped portion and the sloped hole are coordinated with each other in response to sliding of the slider to shift the lock member between the lock position and the unlock position. The slider includes an arm and a pin protruded form a side surface of the arm. The housing includes a guide groove that accommodates the slider slidably and a cover wall that covers the pin when the slider positions at the lock end.

According to the steering lock device, since the cover wall that covers the pin positioning at the lock end is provided in the housing, the slider cannot be removed even if a cover is removed from the housing by an improper act. Therefore, the lock member is held at the lock position and thereby superior antitheft performance can be brought.

A second aspect of the present invention provides a steering lock device that includes a lock member disposed in a housing that is slidable between a lock position at which the lock member engages with a steering shaft to prohibit a rotation of the steering shaft and an unlock position at which the lock member doesn't engage with the steering shaft to allow the rotation of the steering shaft, and urged toward the steering shaft by an urging member; a slider disposed in the housing that is slidably in a direction perpendicular to a moving direction of the lock member; and a slide portion and an auxiliary slide portion each of which is disposed between the slider and the housing. A sloped portion that is linearly sloped toward the steering shaft along a slide direction of the slider is provided on one of the lock member and the slider, and a sloped hole is provided on another of the lock member and the slider. The sloped portion and the sloped hole are coordinated with each other in response to sliding of the slider to shift the lock member between the lock position and the unlock position. The slide portion includes a first slide surface formed on the slider, a second slide surface formed on the housing and opposing to the first slide surface, a guide rail provided on one of the first slide surface and the second slide surfaces along a slide direction of the slider, and a rail receive groove provided on another of the first slide surface and the second slide surfaces so as to overarch the guide rail. The auxiliary slide portion includes a first guide surface formed on the slider, a second guide surface formed on the housing and opposing to the first guide surface, a guide pin protruded from one of the first guide surface and the second guide surface, and a auxiliary guide groove formed on another of the first guide surface and the second guide surface to accommodate the guide pin slidably.

According to the steering lock device, by coupling the guide rail and the rail receive groove that constitute the slide portion with each other and also coupling the guide pin and the auxiliary guide groove that constitute the auxiliary slide portion with each other, the slider cannot be removed even if a cover is removed from the housing by an improper act. Therefore, the lock member is held at the lock position and thereby superior antitheft performance can be brought.

A third aspect of the present invention provides a steering lock device that includes a lock member disposed in a housing that is slidable between a lock position at which the lock member engages with a steering shaft to prohibit a rotation of the steering shaft and an unlock position at which the lock member doesn't engage with the steering shaft to allow the rotation of the steering shaft, and urged toward the steering shaft by an urging member; and a slider disposed in the housing that is slidable between a lock end and an unlock end along a direction perpendicular to a moving direction of the lock member. A sloped portion that is linearly sloped toward the steering shaft along a slide direction of the slider is provided on one of the lock member and the slider, and a sloped hole is provided on another of the lock member and the slider. The sloped portion and the sloped hole are coordinated with each other in response to sliding of the slider to shift the lock member between the lock position and the unlock position. A convex portion is formed on one of the sloped portion and the sloped hole, a concave groove is formed on another of the sloped portion and the sloped hole, and the convex portion and the concave groove are engaged with each other when the slider positions at the unlock end.

According to the steering lock device, since the convex portion and the concave groove are formed on the sloped portion and the sloped hole, respectively, the engagement between the convex portion and the concave groove is held due to an urging force of the urging member when the slider positions at the unlock end. Therefore, an improper movement of the slider toward the lock end due to vibrations or an impact can be prevented.

Here, it is preferable that the housing further includes a lock hole into which the lock member is inserted, and the sloped portion and the sloped hole formed on the lock member are located within the lock hole with surrounded by a sidewall of the lock hole when the lock member positions at the lock position.

According to this, since the lock member is located within the lock hole with surrounded by the sidewall of the lock hole when the lock member positions at the lock position, a coupling portion between the slider and the lock member is not exposed but protected by the sidewall. Therefore, it can be made easy to dispose the slider and the lock member with coordinated with each other in the housing, and superior antitheft performance can be brought.

DESCRIPTION OF EMBODIMENT(S)

Figure 5:
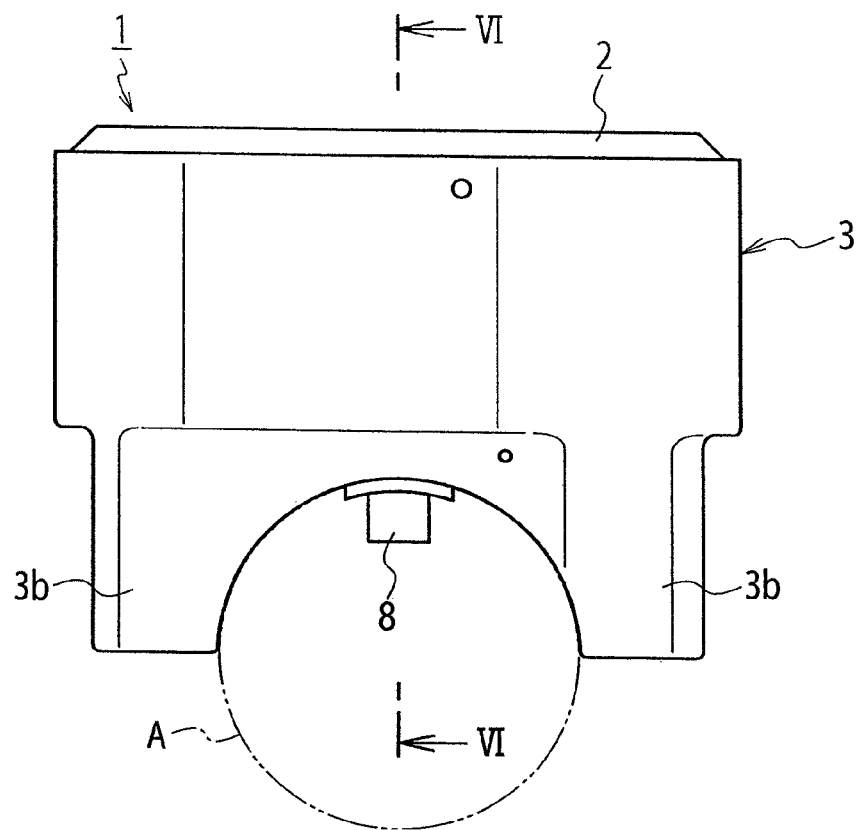
FIG. 5 is a front view showing the steering lock device (locked state) according to the embodiment of the present invention.
Figure 9:
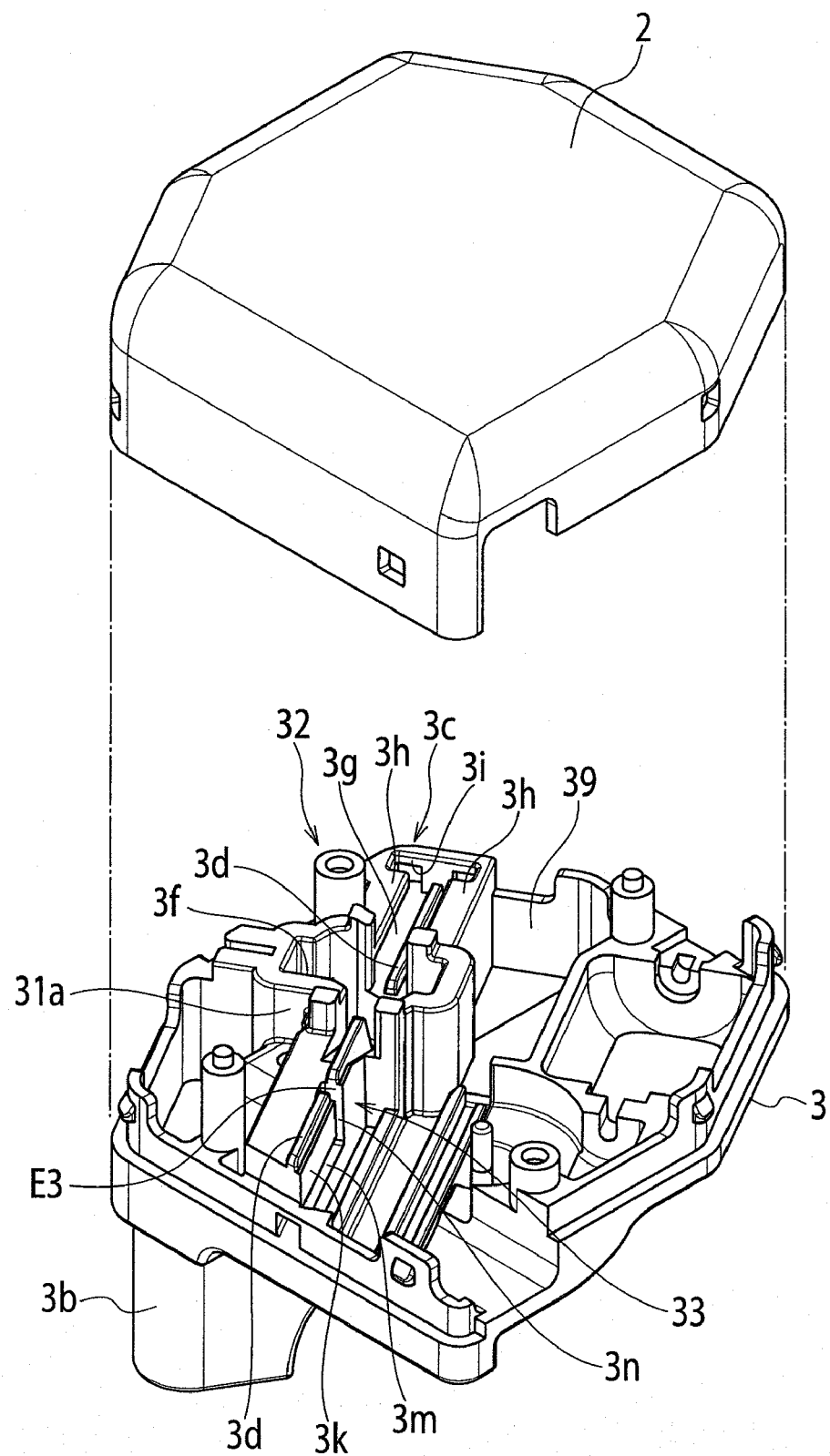
FIG. 9 is an exploded perspective view showing a casing and a cover in the embodiment of the present invention.

Hereinafter, a steering lock device according to an embodiment of the present invention will be explained with reference to FIG. 1 to FIG. 16. The steering lock device 1 according to the present embodiment includes a cover 2 and a housing 3 that are coupled with each other (see FIG. 9), and is attached to a steering column device A (see FIG. 5 and FIG. 7) that houses a steering shaft (not shown).

A component housing chamber 3a that is opened toward one side (e.g. upward in FIG. 2) is formed in an inside of the housing 3. The housing 3 includes a pair of legs 3b and 3b that is arranged so as to lie over the steering column device A (see FIG. 5 and FIG. 7). A motor 4 as a drive source, a worm wheel 5, a slider 6, a hanger member 7, a lock main body 8a, and a printed circuit board 9 are housed in the housing 3. The worm wheel 5 is rotated toward its unlock direction or its lock direction by the motor 4. The slider 6 slides in a direction perpendicular to the lock main body 8a by being driven by the motor 4 via the worm wheel 5. The hanger member 7 engages with the slider 6. The lock main body 8a is coupled with the hanger member 7. The hanger member 7 and the lock main body 8a constitute a lock member 8. An end of the lock main body 8a can be protruded outward from a bottom of the housing 3 to be engaged with the steering shaft. The printed circuit board 9 is disposed at an upper side of these components.

A slide portion 32 (see FIG. 2 and FIG. 4) and an auxiliary slide portion 33 (see FIG. 9) are disposed between a bottom of the component housing chamber 3a and the slider 6. The slide portion 32 consists of a first slide surface 64h, a pair of pins 64i (see FIG. 14(a)), a rail receiving groove 64f (see FIG. 14(b)), and a guide groove 3c (see FIG. 9). The first slide surface 64h, the pins 64i, and the rail receive groove 64f are formed on the slider 6. The guide groove 3c is formed on the bottom of the component housing chamber 3a. In addition, the auxiliary slide portion 33 consists of a first guide surface 61a (see FIG. 14(b)), a guide pin 61b (see FIG. 14 (a) and FIG. 14(b)), a second guide surface 3k (see FIG. 9), and an auxiliary guide groove 3m (see FIG. 9). The first guide surface 61a and the guide pin 61b are formed on the slider 6. The second guide surface 3k and the auxiliary guide groove 3m are formed at the bottom of the component housing chamber 3a.

Figure 10:
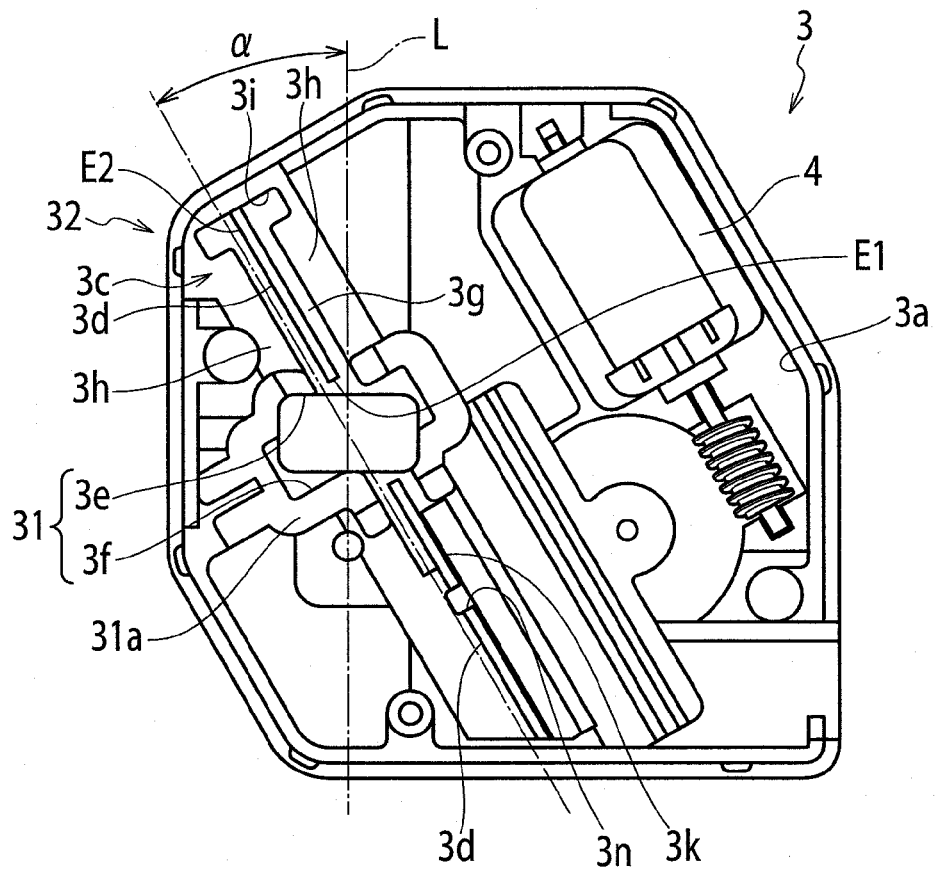
FIG. 10 is a plan view of the casing in the embodiment of the present invention.

As shown in FIG. 10, the guide groove 3c is arranged so as to be inclined with a predetermined angle α (>0) to an axial direction (straight line L) of the steering shaft. An arm 64 of the slider 6 (see FIG. 14(a)) is slidably housed in the guide groove 3c. The guide groove 3c includes a second slide surface 3g, a guide rail 3d, and cover walls 3h. The second slide surface 3g is located at a bottom of the guide groove 3c and a surface parallel to the axial direction of the steering shaft. The guide rail 3d is formed on the second slide surface 3g along a longitudinal direction of the guide groove 3c. The guide rail 3d guides the rail receive groove 64f of the slider 6.

The cover walls 3h are disposed so as to cover the pin 64i in an area including a lock end E1 (see FIG. 1) and except an unlock end E2 (see FIG. 3) within a moving range of the slider 6. Note that the pins 64i can be inserted through cutouts 3i without covered by the cover walls 3h at the unlock end E2.

The second guide surface 3k intersects the second slide surface 3g and disposed along a slide direction of the slider 6. In addition, the auxiliary guide groove 3m is extended on the second guide surface 3k along the slide direction of the slider 6. Further, an insertion groove 3n that communicates with the auxiliary guide groove 3m is formed at an unlock end 3E (see FIG. 9) of the auxiliary guide groove 3m.

On the housing 3, formed is a lock hole 31 that extends along a direction perpendicular to the axial direction and penetrates from the bottom of the component housing chamber 3a toward the steering column device A. The lock hole 31 is formed of a rectangular first hole 3e and a rectangular second hole 3f (see FIG. 10). The lock main body 8a and the hanger member 7 are inserted into the first hole 3e. The hangar member 7 is inserted into the second hole 3f. As shown in FIG. 10, the first hole 3e occupies a part near the steering column device A of the lock hole 31. The first hole 3e has a relatively small cross-sectional area, and is elongated in a direction perpendicular to the axial direction (the straight line L). The second hole 3f occupies a side near the component housing chamber 3a of the lock hole 31. The second hole 3f has a relatively large cross-sectional area, and is elongated in a direction perpendicular to the slide direction (the guide rail 3d) of the slider 6.

Figure 6:
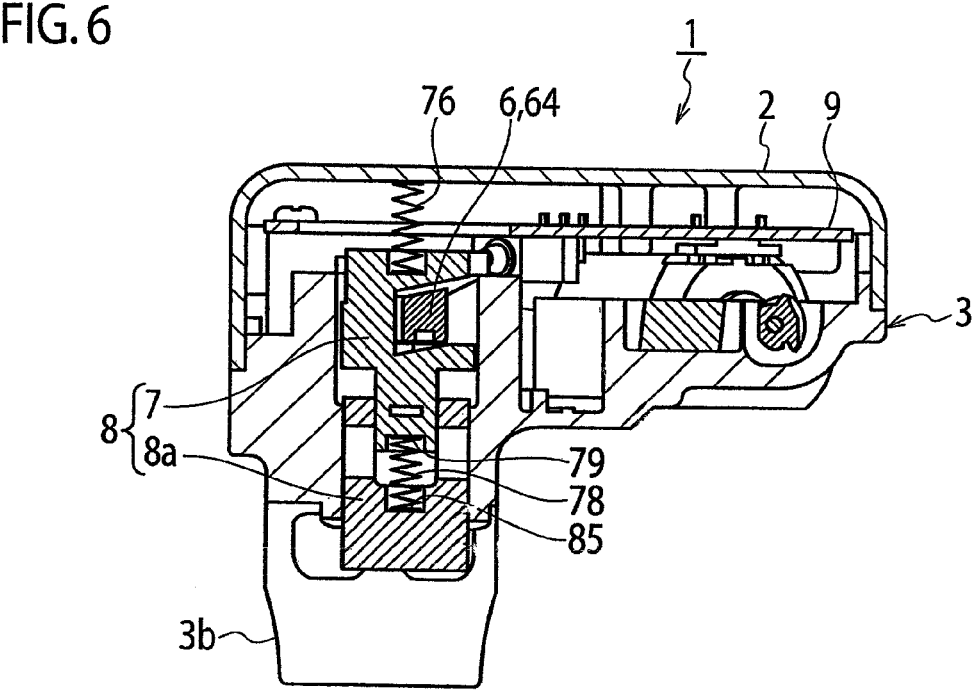
FIG. 6 is a cross-sectional view taken along a line VI-VI shown in FIG. 5.
Figure 7:
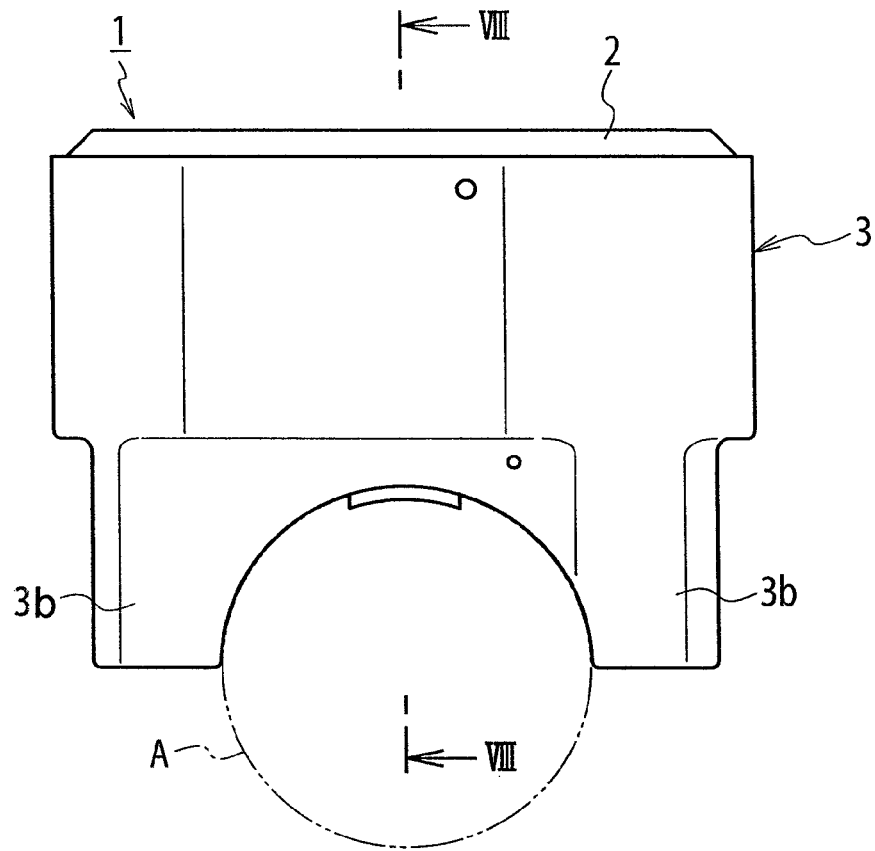
FIG. 7 is a front view showing the steering lock device (unlocked state) according to the embodiment of the present invention.
Figure 8:
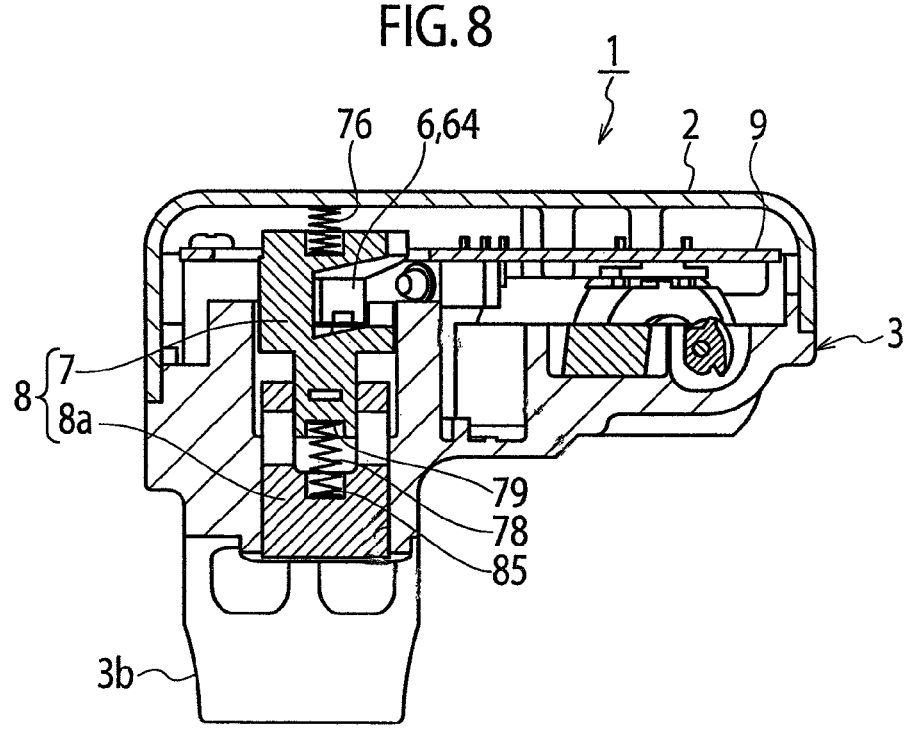
FIG. 8 is a cross-sectional view taken along a line VIII-VIII shown in FIG. 7.

A boss 2a protruding inward from a back surface of the cover 2 is integrally formed on the cover 2 (see FIG. 6). In addition, the housing 3 includes a boss plate 34, a boss spring 35, and a boss case 36. The boss plate 34 engages with the boss 2a. The boss spring 35 urges the boss plate 34 toward the hanger member 7. The boss case 36 holds the boss spring 35. The boss 2a protrudes from a hole of the housing 3 and engages with the boss plate 34 in a state where the cover 2 is attached to the housing 3, so that the boss plate 34 is held with distance away from the lock main body 8a.

Figure 13:
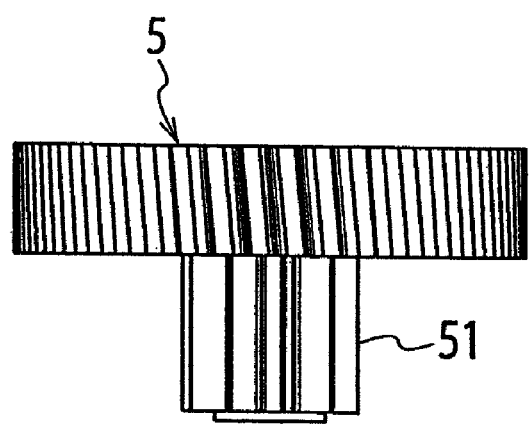
FIG. 13 is a front view showing a worm wheel in the embodiment of the present invention.
Figure 14:
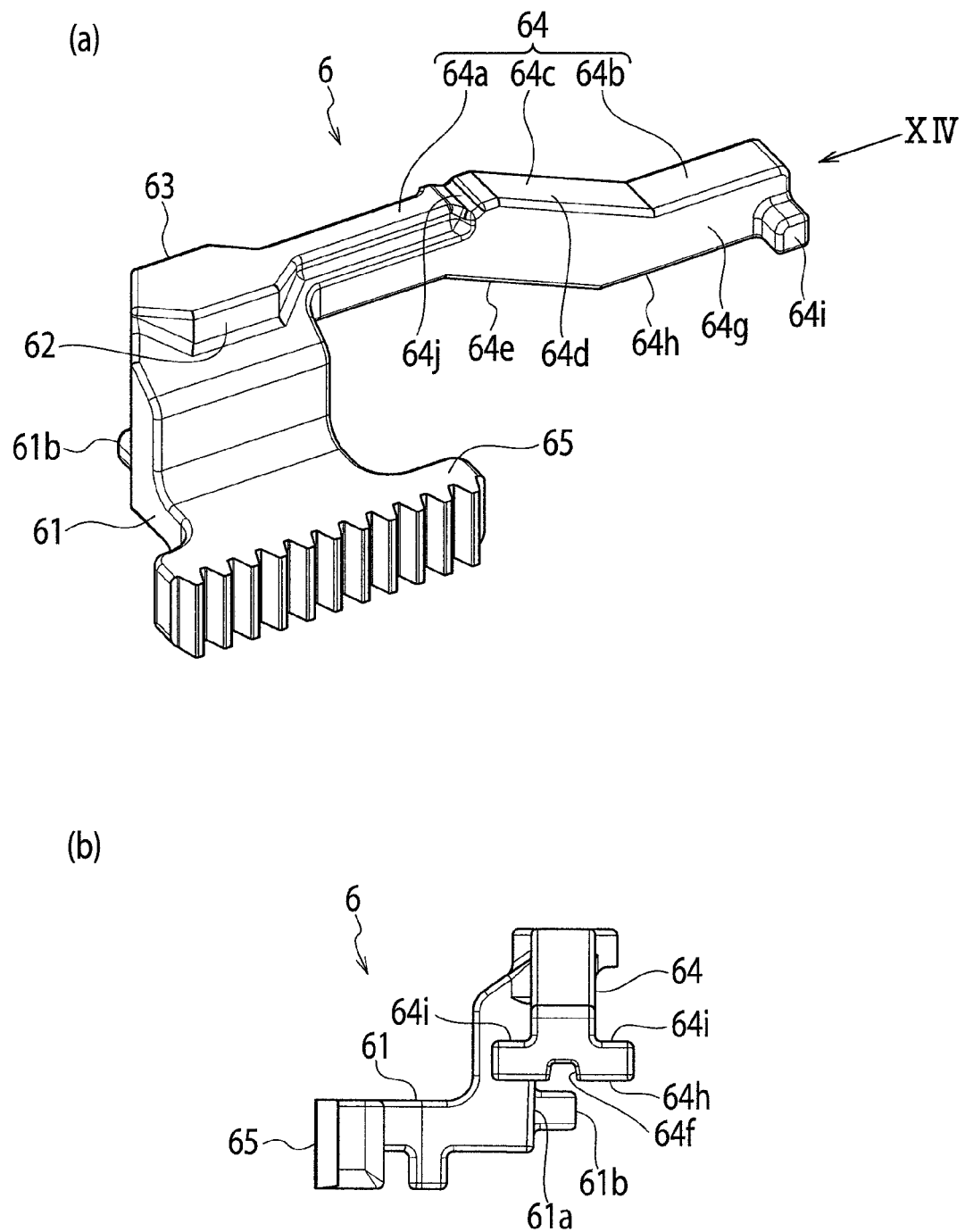
FIG. 14 (a) is a perspective view showing a sliding member in the embodiment of the present invention, and (b) is a side view thereof viewed from a XIV direction shown in FIG. 10(a).
Figure 15:
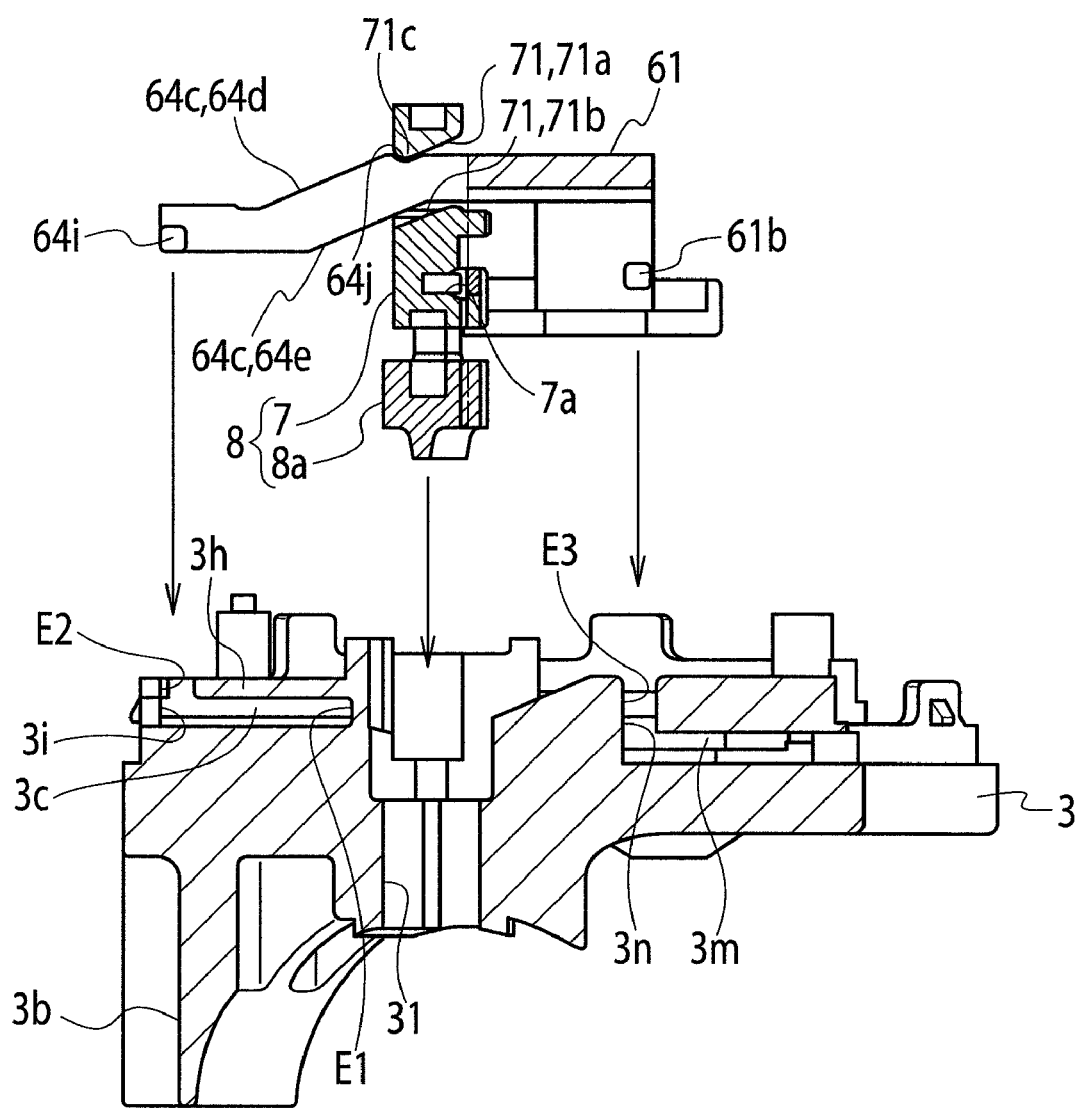
FIG. 15 is a cross-sectional view showing an assembling step wherein the sliding member to which the lock member has been attached is assembled to a housing.
Figure 16:
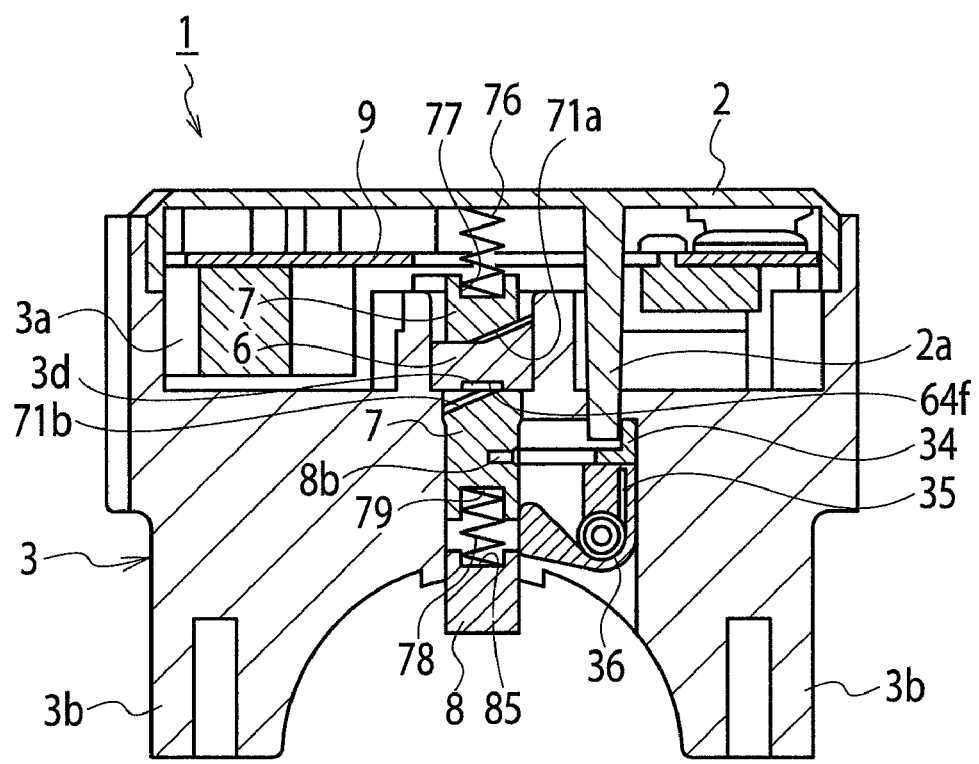
FIG. 16 is a cross-sectional view taken along a line XVI-XVI shown in FIG. 1.
Figure 17:
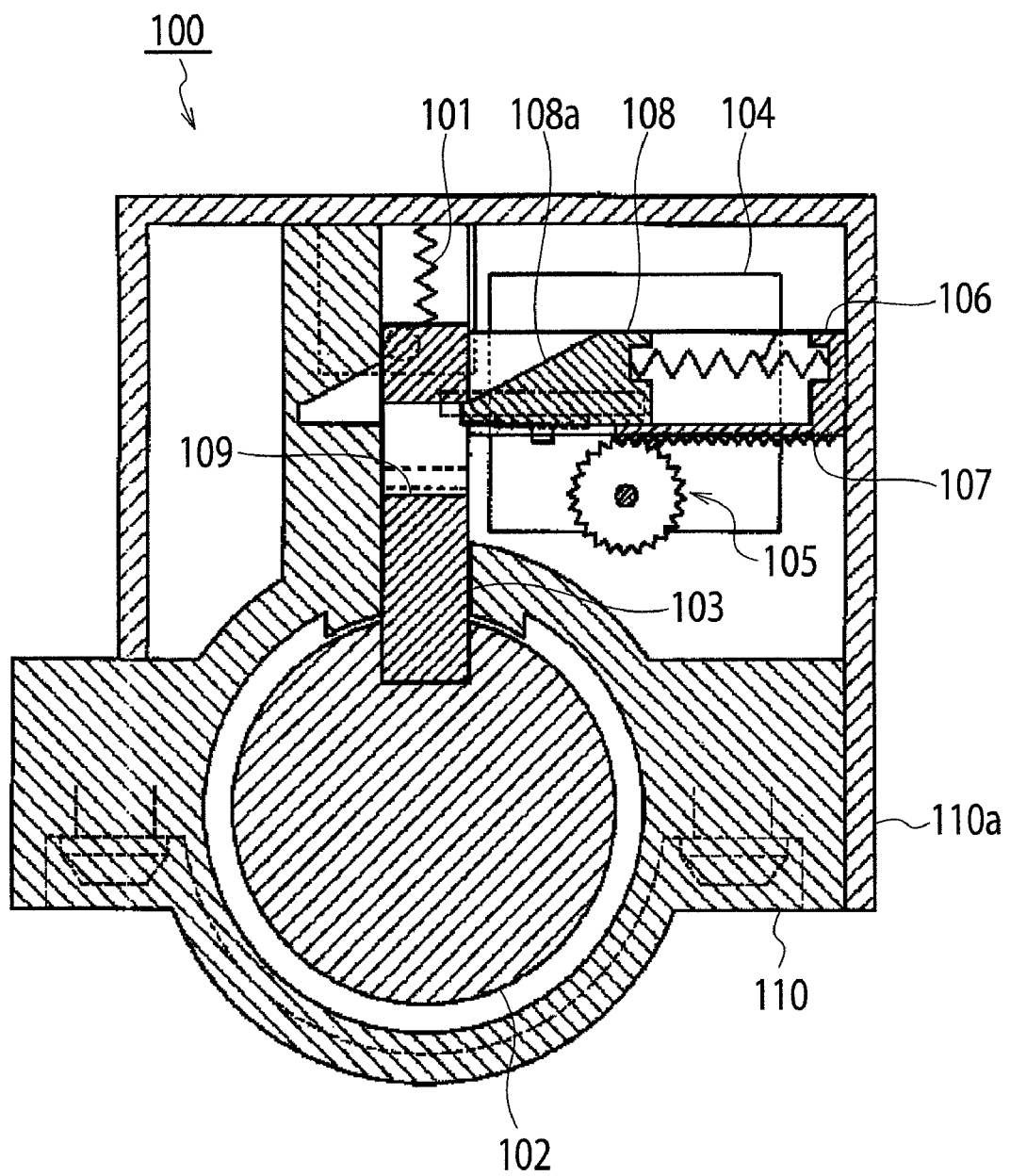
FIG. 17 is a plan view showing a conventional steering lock device.

A worm gear 42 that meshes with the worm wheel 5 is fixed to a rotational axis 41 of the motor 4. As shown in FIG. 13, a drive gear 51 that rotates integrally with the worm wheel 5 is provided on the worm wheel 5.

As shown in FIG. 14(a) and FIG. 14(b), the slider 6 is composed of a base 61, cams 62 and 63, an arm 64, and a rack 65. The cams 62 and 63 are provided at one end of the base 61. The arm 64 is extended from the one end of the base 61. The rack 65 is extended at another end of the base 61 along the slide direction, and meshed with the above-mentioned drive gear 51. The guide pin 61b is formed on the first guide surface 61a opposed to the second guide surface 3k. The guide pin 61b is protruded toward the second guide surface 3k and slidable in the auxiliary guide groove 3m.

The arm 64 is integrally constituted of a base portion 64a, an end portion 64b, and a sloped potion 64c (sloped portion of the slider 6). The base portion 64a and the end portion 64b extend along the slide direction of the slider 6, respectively. The sloped portion 64c interposes between the base portion 64a and the end portion 64b. The sloped portion 64c is tilted so as to gradually get close to the steering shaft from the base portion 64a toward the end portion 64b (see FIG. 2 and FIG. 4). In addition, the rail receive groove 64f is formed on the first slide surface 64h opposed to the second guide surface 3g. The rail receive groove 64f is formed along a longitudinal direction of the arm 64 so as to overarch the guide rail 3d. Further, a pair of the pins 64i protruding sideward is disposed on both side surfaces 64g of the end portion 64b. The guide rail 3d is set in the rail receive groove 64f, so that the slider 6 is guided to slide by the guide rail 3d.

In addition, a concave groove 64j is formed at an end of the base portion 64a near the sloped potion 64c (see FIG. 14(a)). On the other hand, a convex portion 71c is formed on an upper surface of a sloped hole 71 of the hanger member 7 (a sloped portion of the lock member 8) (see FIG. 4). In a state where the slider 6 positions at the unlock end E2, the hanger member 7 is urged toward the slider 6 due to an urging force by an after-mentioned urging member. As a result, the concave groove 64j and the convex portion 71c are engaged with each other. When the slider 6 is slid toward the lock end E1 due to driving of the motor 4, engagement between the concave groove 64j and the convex portion 71c are disengaged.

The slide 6 can slide between the lock end E1 and the unlock end E2 of the guide rail 3. The lock main body 8a is moved by the sloped portion 64c while the slider 6 slides, and thereby the lock main body 8a shifts between its lock position (see FIG. 2) for prohibiting rotation of the steering shaft and its unlock position (see FIG. 4) for allowing the rotation of the steering shaft. Note that an unlock portion 64d (an unlocking sloped portion on the slider 6) is formed on a surface of the sloped portion 64c on a side of the cover 2 (an upper side in FIG. 14(a)). In addition, a lock portion 64e (a locking sloped portion on the slider 6) is formed on a surface of the sloped portion 64c on a side of the housing 3 (an under side in FIG. 14(a)).

Figure 2:
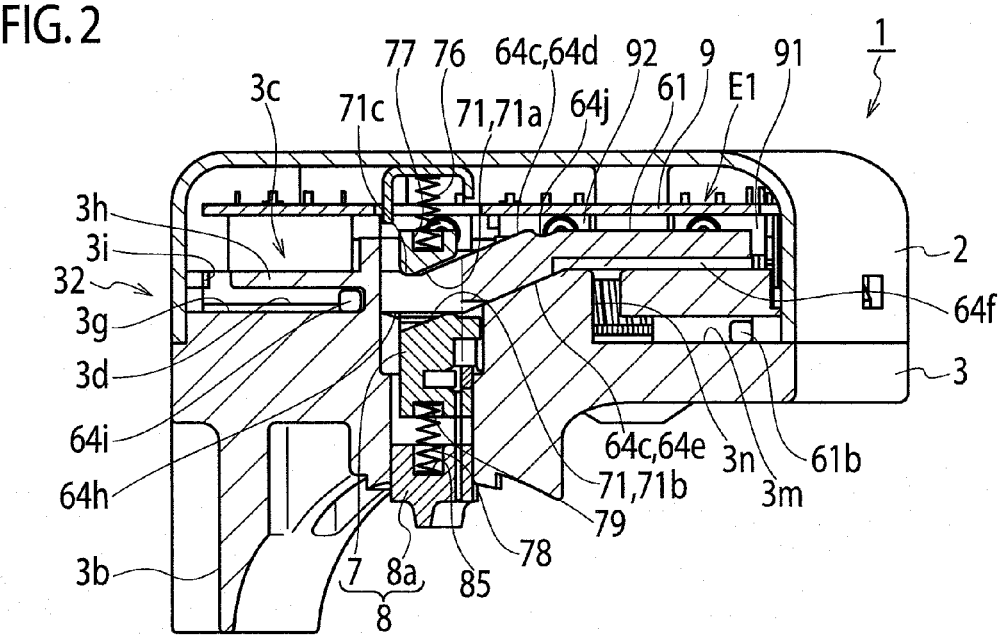
FIG. 2 is a cross-sectional view taken along a line II-II shown in FIG. 1.
Figure 11:
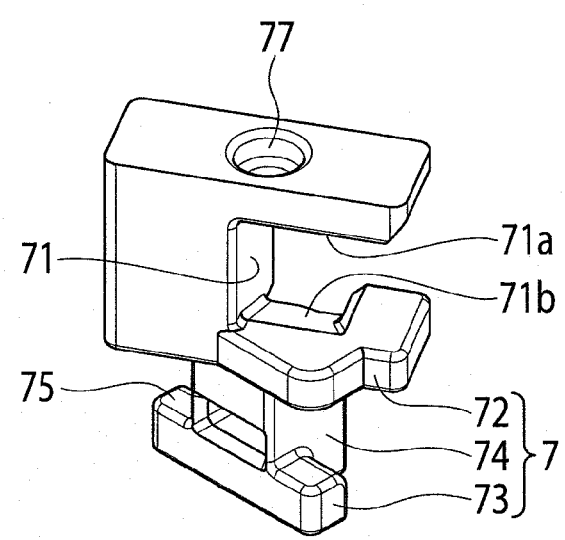
FIG. 11 is a perspective view showing a hanger member in the embodiment of the present invention.

As shown in FIG. 11, the hanger member 7 is constituted of a base 72, and a coupling portion 73. The sloped hole 71 through which the slider 6 is inserted is formed on a center of the base 72. The coupling portion 73 is protruded from a lower end of the base 72, and coupled with the lock main body 8a. A longitudinal direction of the base 72 is arranged perpendicularly to the guide rail 3d. On the other hand, a longitudinal direction of the coupling portion 73 is arranged perpendicularly to the axial direction of the steering shaft (the straight line L). Cutouts 74 and 75 that catch after-mentioned arms 81 and 82 of the lock main body 8a are formed between the base 72 and the coupling portion 73. A lateral internal width of the sloped hole 71 is set slightly larger than a width of the arm 64 of the slider 6. An unlock portion 71a (an unlocking sloped portion on the lock member 8) at an upper edge of the sloped hole 71. A lock portion 71b (a locking sloped portion on the lock member 8) at a lower edge of the sloped hole 71. Sloped angles of the inner edges (the unlock portion 71a and the lock portion 71b) of the sloped hole 71 are similar to a sloped angle of the sloped portion 64c of the slider 6. Note that the hanger member 7 and the lock main body 8a are provided so as to locate the sloped hole 71 in the inside of the lock hole 31 with surrounded by sidewalls 31a (see FIG. 9) that form the lock hole 31 in a sate where the lock main body 8a positions at the lock position (FIG. 2).

A hole 77 for receiving an end of a first coil spring (urging member) 76 is formed on an end surface (upper surface) of the base 72 on a side of the cover 2. In addition, a hole 79 for receiving an end of a second coil spring 78 is formed on an end surface (under surface) of the coupling portion 73 on a side of the steering column device A (see FIG. 2, FIG. 4 and so on).

Figure 12:
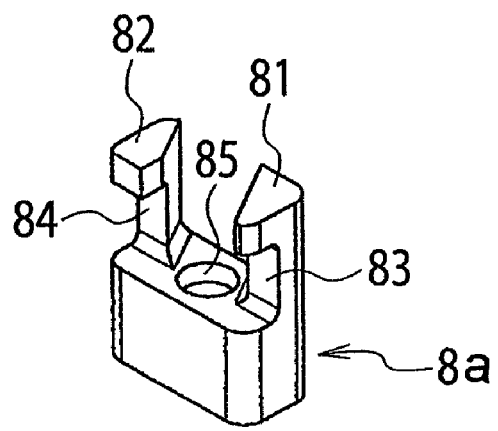
FIG. 12 is a perspective view showing a lock member in the embodiment of the present invention.

As shown in FIG. 12, the pair of arms 81 and 82 that protrude towards the hanger member 7 (upward in FIG. 12) is provided at an end of the lock main body 8a. Cutouts 83 and 84 that receive the coupling portion 73 of the hanger member 7 are provided at basal portions of the arms 81 and 82. A hole 85 for receiving another end of the second coil spring 78 is formed on an end surface (under surface) of the lock main body 8a on a side of the cover 2.

Figure 1:
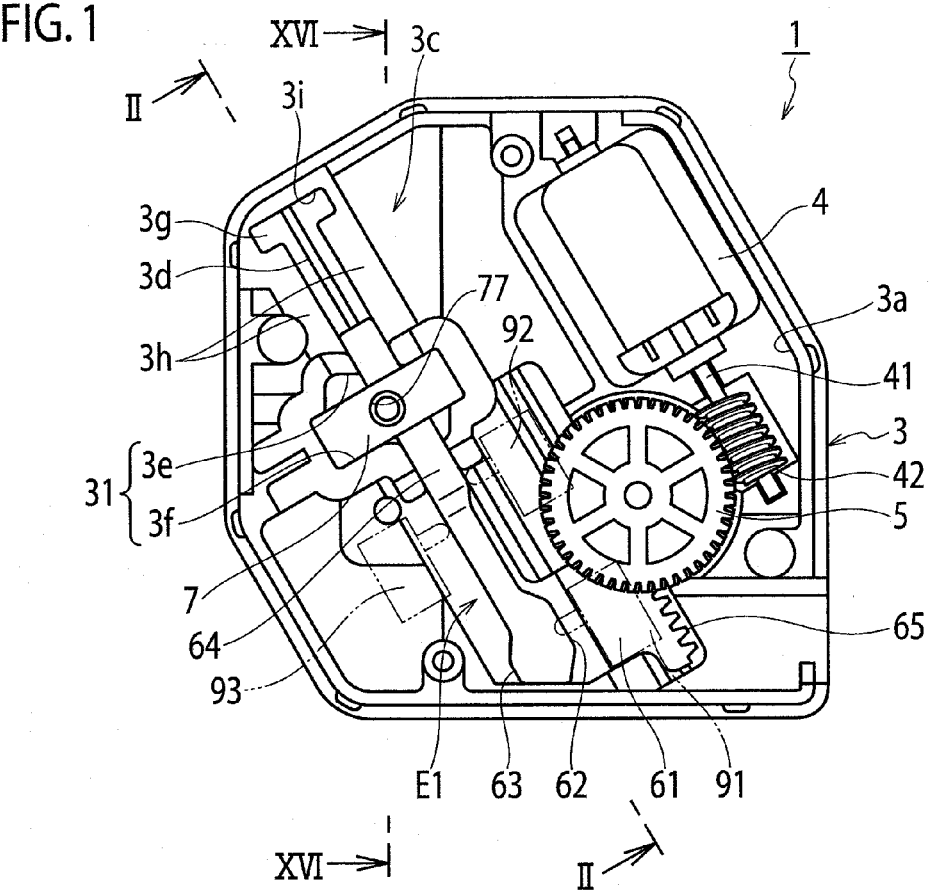
FIG. 1 is a plan view showing a steering lock device (locked state) according to an embodiment of the present invention.
Figure 3:
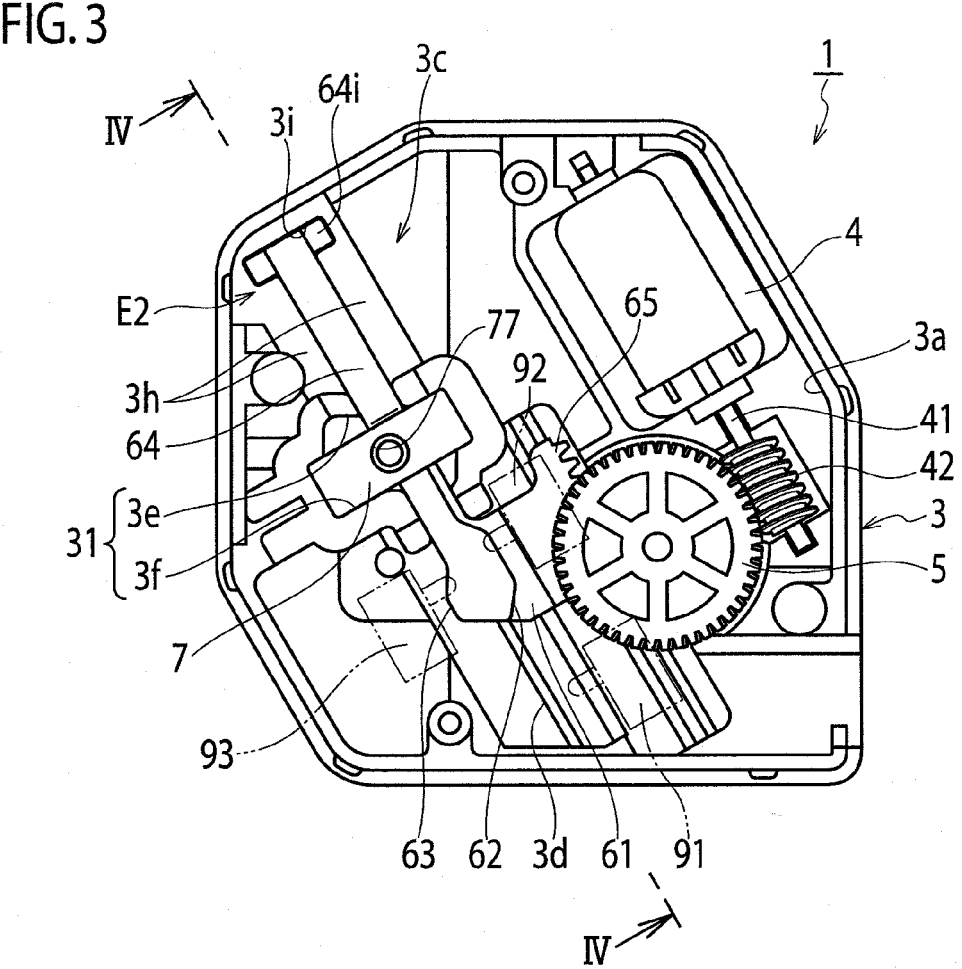
FIG. 3 is a plan view showing the steering lock device (unlocked state) according to the embodiment of the present invention.
Figure 4:
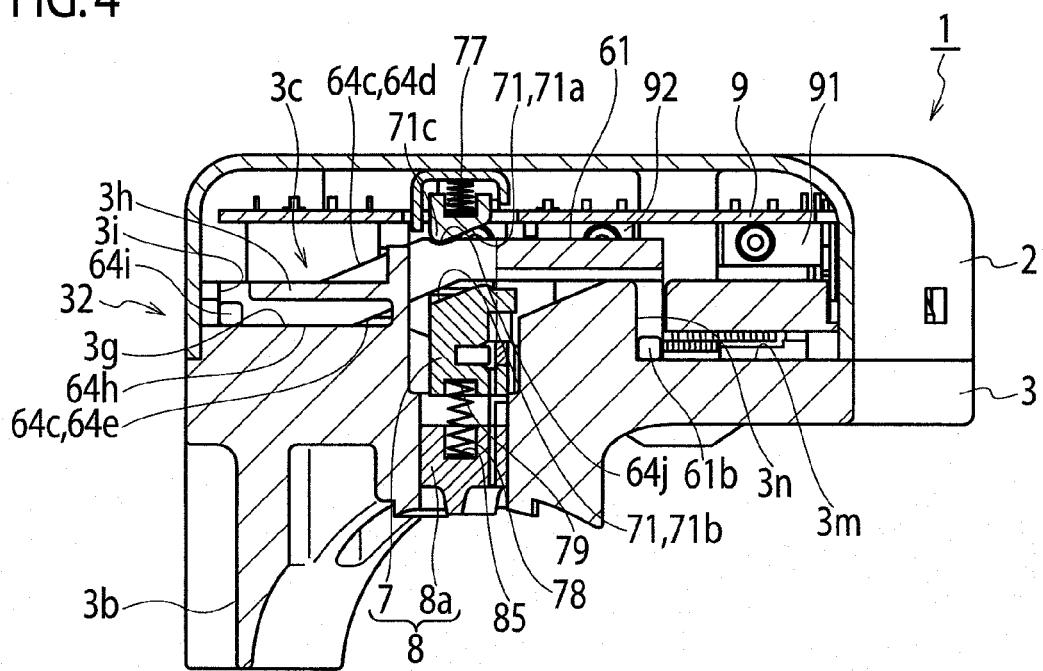
FIG. 4 is a cross-sectional view taken along a line IV-IV shown in FIG. 3.

Detection switches (detection units) 91 to 93 that operate in response to sliding of the slider 6 are provided on the printed circuit board 9 along side surfaces 64g of the slider 6 (see FIG. 1 and FIG. 3). As shown in FIG. 1, when the first detection switch 91 operates due to its contact with the first cam 62 of the slider 6, it is detected that the lock main body 8a is at the lock position. In addition, as shown in FIG. 3, when the second detection switch 92 operates due to its contact with the first cam 62 and the third detection switch 93 operates due to its contact with the second cam 63, it is detected that the lock main body 8a is at the unlock position. Note that the detection switches 91 to 93 may be either of a contact type (mechanical type) or a non-contact type (e.g. hole sensor). In addition, the number of the detection switches is determined according to required specifications such as steadiness. Since the slide 6 is guided by the guide rail 3d and the rail receive groove 64f, the detection switches 91 to 93 are arranged along the both side surfaces 64g of the slider 6.

Next, assembly processes of the steering lock device 1 will be explained. Firstly, the hanger member 7 is coupled with the lock main body 8a from its side while locating the second coil spring 78 between the hole 85 on the lock main body 8a and the hole 79 on the lock member 7. The coupling portion 73 is caught in the cutouts 83 and 84, and the arms 81 and 82 are caught in the cutouts 74 and 75. In addition, the arm 64 is inserted through the sloped hole 71. The slider 6, the hanger member 7 and the lock main body 8a that have been subassembled are housed in the component housing chamber 3a of the housing. At this time, the lock main body 8a and the coupling portion 73 of the hanger member 7 are inserted into the first hole 3e through the second hole 3f. In addition, the base 72 of the hanger member 7 is inserted into the second hole 3f. Concurrently, the pair of pins 64i is inserted into the guide groove 3c through the cutouts 3i to locate the arm 64 in the guide 3c, and the guide pin 61b is located into the auxiliary guide groove 3m through the insertion groove 3n.

Subsequently, the worm wheel 5 is disposed at a designated position in the component housing chamber 3a. At this time, the drive gear 51 and the rack 65 of the slider 6 are meshed with each other. The motor 4 is disposed in the vicinity of the worm wheel 5, and the worm gear 42 on the rotational axis 41 and the worm wheel 5 are meshed with each other. Further, the printed circuit board 9 is disposed at an upper portion in the component housing chamber 3a, and wirings are applied thereto. The printed circuit board 9 is fixed with screws in the component housing chamber 3a. And then, the first coil spring 76 is located in the hole 77 on the hanger member 7, and the cover 2 is attached to the housing 3 to cover the component housing chamber 3a.

Subsequently, the boss case 36 into which the boss plate 34 and the boss spring 35 were preliminarily installed is attached to the housing 3 from a bottom side of the housing. At this time, the boss plate 34 is inserted into the inside of the housing 3 and then engaged with the boss 2a of the cover 2. In addition, the boss spring 35 and the boss case 36 are also inserted into the housing 3.

After assembling the steering lock device 1 as explained above, the pair of legs 3b and 3c is attached to the steering column device A so as to lie over the steering column device A.

Next, behaviors of the steering lock device 1 will be explained. When locking by the lock main body 8a as shown in FIG. 1, FIG. 2, FIG. 5, and FIG. 6, the slider 6 is at the lock end E1 of the guide rail 3d, and the end portion 64b and the sloped portion 64c of the slider 6 engage with the sloped hole 71 of the hanger member 7. Therefore, the lock main body 8a coupled with the hanger member 7 is at the lock position P1. Namely, the lock main body 8a protrudes from the bottom of the housing 3 to engage with the steering shaft. As a result, rotation of the steering shaft is prohibited, and thereby an automobile is kept in an impossible state to be driven.

Note that, if the cover 2 is removed from the housing 3 after assembling, the boss 2a is got away from the boss plate 34, and then the boss plate 34 is moved toward the lock main body 8a by the boss spring 35. As a result, an end of the boss plate 34 engages with an engagement hole 8b (see FIG. 16) on the hanger member 7. According to this, movement of the lock member (the hanger member 7 and the lock main body 8a) along its axial direction is prohibited to keep a locked state of the steering shaft by the lock main body 8a, so that antitheft security during parking can be improved.

Subsequently, when the motor 4 is rotated toward its unlock direction due to an output of an unlock signal, the rack 65 is driven by the drive gear 51 via the rotation axis 41, the worm gear 42 and the worm wheel 5. As a result, the slider 6 is moved from the lock end E1 toward the unlock end E2 along the guide rail 3d of the housing 3. Along with this, the hanger member 7 is moved along the sloped portion 64c under a state where the unlock portion 64d of the slider 6 is being contacted with the unlock portion 71a of the hanger member 7. As a result, the lock main body 8a is stroked in conjunction with the hanger member 7 so as to be distanced away from the steering shaft.

Subsequently, when the motor 4 is further rotated toward the unlock direction, established is an unlock state as shown in FIG. 3, FIG. 4, FIG. 7, and FIG. 8 where the lock main body 8a is drawn into the housing 3 to be set at the unlock position, and thereby the automobile is made in a possible state to be driven. Here, the second detection switch 92 operates due to its contact with the first cam 62 and the third detection switch 93 operates due to its contact with the second cam 63 while the slider 6 slides toward the unlock end E2 of the guide rail 3d, so that it is detected that the lock main body 8a is at the unlock position to establish a stand-by state possible to start an engine.

Subsequently, the worm wheel 5 is rotated toward its lock direction by the drive of the motor 4 for resetting to a locked state due to an output of a lock signal, so that the lock main body 8a is moved to the lock position with following the slider 6. During this, the hanger member 7 and the lock main body 8a are being urged toward the steering column device A by the first coil spring 76 and the second coil spring 78. Therefore, the hanger member 7 is moved along the sloped portion 64c under a state where the lock portion 64e and the lock portion 71b are being contacted with each other, so that the lock main body 8a is moved toward the steering shaft. As a result, the lock main body 8a engages with the steering shaft to prohibit rotation of the steering shaft, and thereby the automobile is made in an impossible state to be driven. Here, if the lock main body 8a doesn't engage with any of engagement grooves on the steering shaft but contacts with outer surfaces between the engagement grooves, the steering shaft further rotates and thereby the lock main body 8a will engage with any of the engagement grooves on the steering shaft due to an urging force by the second coil spring 78 to prohibit a rotation of the steering shaft.

In the present embodiment, since the cover walls 3h that covers the pins 64i positioning at the lock end E1 are provided in the guide groove 3c, the slider 6 cannot be removed even if the cover 2 is removed from the housing 3 by an improper act. As a result, the lock member 8 is held at the lock position and thereby superior antitheft performance can be brought.

By coupling the guide rail 3d and the rail receive groove 64f with each other (the slide portion 32) and also coupling the guide pin 61b and the auxiliary guide groove 3m with each other (the auxiliary slide portion 33), the slider 6 cannot be removed even if the cover 2 is removed from the housing 3 by an improper act. As a result, the lock member 8 is held at the lock position and thereby superior antitheft performance can be brought.

Since the sloped hole 71 is located in the inside of the lock hole 31 with surrounded by the sidewalls 31a in a state where the lock member 8 positioned at the lock position, a coupling portion between the slider 6 and the hanger member 7 is not exposed but protected by the sidewalls 31a. Therefore, it can be made easy to dispose the slider 6 and the lock member 8 with coordinated with each other in the housing 3, and superior antitheft performance can be brought.

The lock member 8 (the hanger member 7 and the lock main body 8a) is moved due to the sloped portion 64c linearly sloped toward the steering shaft along the slide direction of the slider 6 while the slider 6 slides, and thereby the lock main body 8a is stroked toward the steering shaft. Therefore, a height along a stroke direction of the lock member 8 can be made low to achieve downsizing. In addition, a stroke amount of the lock main body 8a and a driving force need for its stroke can be changed only by replacing the slider 6, so that cost reduction by commoditization of main components can be achieved.

According to the present embodiment, the worm wheel 5 is driven by the motor 4 and thereby rotates toward its lock direction or its unlock direction to drive the rack 65 provided on the slider 6, so that the slider 6 can be smoothly slid.

According to the present embodiment, the lock main body 8a is moved to engage with the steeing shaft while the slider 6 slides and thereby a rotation of the steering shaft is prohibited. In addition, if the lock main body 8a jams while stroking, the lock main body 8a will be forcebly moved by the slider 6 and thereby the lock main body 8a can moved unfailingly.

According to the present embodiment, the concave groove 64j and the convex portion 71c are formed to be able to be engaged with each other on the arm 64 and the sloped hole 71 that contact with each other. Therefore, the engagement between the concave groove 64j and the convex portion 71c is held due to an urging force of the first coil spring 76 in a state where the slider 6 positions at the unlock end E2, so that an improper movement of the slider 6 toward the lock end E1 due to vibrations or an impact can be prevented.

In the present embodiment, a stroke position of the lock main body 8a is detected by way of a position of the slider 6 by the detection switches 91 to 93 that operate in response to sliding of the slider 6. Therefore, the detection switches 91 to 93 can be disposed more easily than a case where the stroke position of the lock main body 8a is detected directly by detection unit(s). Here, since the lock main body 8a follows a movement of the slider 6, the position of the lock main body 8a can be detected unfailingly. In addition, since the detection switches 91 to 93 are disposed along the side surfaces 64g of the slider 6, a height of an entire device along the stroke direction of the lock main body 8a can be restricted. Note that, if a detection unit(s) is made operated in response to a stroke of the lock main body 8a, the height of the lock main body 8a along its stroke direction is relatively low, so that an installation location of the detection unit(s) is restricted and thereby installation of the detection unit(s) becomes difficult.

In the present embodiment, since the guide rail 3d of the housing 3 and the axial direction of the steering shaft are arranged "skew", a height of the slider 6 (i.e. a height along the stroke direction of the lock main body 8a) that is guided by the guide rail 3d can be restricted. In addition, since an angle made between the guide rail 3d of the housing 3 and the axial direction (straight line L) of the steering shaft that are arranged "skew" is set to the predetermined angle α (>0), a length of the guide rail 3d, i.e. a stroke amount of the slider 6 can be made relatively longer than a case where the guide rail 3d and the axial direction (straight line L) of the steering shaft are parallel to each other in a space. Therefore, downsizing of the steering lock device 1 can be brought more efficiently. In addition, the stroke amount of the lock main body 8a can be prolonged by setting the sloped portion 64c of the slider 6 longer, or the drive force need for stroking the lock main body 8a can be increased by setting a sloped angle of the sloped portion 64c of the slider 6 smaller.

The invention claimed is:

1. A steering lock device comprising:
    a lock member disposed in a housing that is slidable between a lock position at which the lock member engages with a steering shaft to prohibit a rotation of the steering shaft and an unlock position at which the lock member doesn't engage with the steering shaft to allow the rotation of the steering shaft, and urged toward the steering shaft by an urging member; and
    a slider disposed in the housing that is slidable between a lock end and an unlock end along a direction perpendicular to a moving direction of the lock member,
    wherein
    the slider penetrates an opening in the lock member and variably contacts the lock member at a contact location at a surface defining the opening,
    the slider is provided at the contact location with a sloped portion that is linearly sloped toward the steering shaft along a slide direction of the slider, and the lock member is provided at the surface defining the opening with a sloped portion that is linearly sloped toward the steering shaft along a slide direction of the slider,
    the sloped portion of the slider and the sloped portion of the lock member are coordinated with each other in response to sliding of the slider to shift the lock member between the lock position and the unlock position, and
    the slider includes an arm and a pin protruded from a side surface of the arm, and the housing includes a guide groove that accommodates the slider slidably and a cover wall that covers the pin when the slider positions at the lock end.

2. The steering lock device according to claim 1, wherein the housing further includes a lock hole into which the lock member is inserted, and
    the sloped portion of the slider and the sloped portion of the lock member are located within the lock hole and surrounded by a sidewall of the lock hole when the lock member positions at the lock position.

3. A steering lock device comprising:
    a lock member disposed in a housing that is slidable between a lock position at which the lock member engages with a steering shaft to prohibit a rotation of the steering shaft and an unlock position at which the lock member doesn't engage with the steering shaft to allow the rotation of the steering shaft, and urged toward the steering shaft by an urging member;
a slider disposed in the housing that is slidable in a direction perpendicular to a moving direction of the lock member; and
a slide portion and an auxiliary slide portion each of which is disposed between the slider and the housing,
wherein
the slider penetrates an opening in the lock member and variably contacts the lock member at a contact location at a surface defining the opening,
the slider is provided at the contact location with a sloped portion that is linearly sloped toward the steering shaft along a slide direction of the slider, and the lock member is provided at the surface defining the opening with a sloped portion that is linearly sloped toward the steering shaft along a slide direction of the slider,
the sloped portion of the slider and the sloped portion of the lock member are coordinated with each other in response to sliding of the slider to shift the lock member between the lock position and the unlock position,
the slide portion includes
   a first slide surface formed on the slider,
   a second slide surface formed on the housing and opposing to the first slide surface,
   a guide rail provided on one of the first slide surface and the second slide surface along a slide direction of the slider, and
   a rail receive groove provided on another of the first slide surface and the second slide surfaces surface so as to overarch the guide rail, and
the auxiliary slide portion includes
   a first guide surface formed on the slider,
   a second guide surface formed on the housing and opposing to the first guide surface,
   a guide pin protruded from one of the first guide surface and the second guide surface, and
   an auxiliary guide groove formed on another of the first guide surface and the second guide surface to accommodate the guide pin slidably.

4. The steering lock device according to claim 3, wherein the housing further includes a lock hole into which the lock member is inserted, and
the sloped portion of the slider and the sloped portion of the lock member formed on the lock member are located within the lock hole and surrounded by a sidewall of the lock hole when the lock member positions at the lock position.

5. A steering lock device comprising:
a lock member disposed in a housing that is slidable between a lock position at which the lock member engages with a steering shaft to prohibit a rotation of the steering shaft and an unlock position at which the lock member doesn't engage with the steering shaft to allow the rotation of the steering shaft, and urged toward the steering shaft by an urging member; and
a slider disposed in the housing that is slidable between a lock end and an unlock end along a direction perpendicular to a moving direction of the lock member,
wherein
the slider penetrates an opening in the lock member and variably contacts the lock member at a contact location at a surface defining the opening,
the slider is provided at the contact location with a sloped portion that is linearly sloped toward the steering shaft along a slide direction of the slider, and the lock member is provided at the surface defining the opening with a sloped portion that is linearly sloped toward the steering shaft along a slide direction of the slider,
the sloped portion of the slider and the sloped portion of the lock member are coordinated with each other in response to sliding of the slider to shift the lock member between the lock position and the unlock position,
a convex portion is formed on the surface defining the opening of the sloped portion of the lock member, a concave groove is formed on the sloped portion of the slider and the convex portion and the concave groove are engaged with each other when the slider positions at the unlock end.

6. The steering lock device according to claim 5, wherein the housing further includes a lock hole into which the lock member is inserted, and
the sloped portion of the slider and the sloped portion of the lock member formed on the lock member are located within the lock hole and surrounded by a sidewall of the lock hole when the lock member positions at the lock position.

* * * * *